US008767583B2

(12) United States Patent
Zhou et al.

(10) Patent No.: US 8,767,583 B2
(45) Date of Patent: Jul. 1, 2014

(54) NETWORK RESOURCE ALLOCATING METHOD AND COMPUTER PROGRAM PRODUCT THEREOF

(75) Inventors: Zheng-Bo Zhou, Jiangsu (CN); Ruo-Yu Cao, Jiangsu (CN)

(73) Assignee: Sercomm Corporation, Taipei (TW)

( * ) Notice: Subject to any disclaimer, the term of this patent is extended or adjusted under 35 U.S.C. 154(b) by 453 days.

(21) Appl. No.: 13/222,146

(22) Filed: Aug. 31, 2011

(65) Prior Publication Data

US 2012/0287816 A1 Nov. 15, 2012

(30) Foreign Application Priority Data

May 10, 2011 (CN) .......................... 2011 1 0129638

(51) Int. Cl.
*H04L 12/26* (2006.01)
*H04B 7/212* (2006.01)

(52) U.S. Cl.
USPC ........................... 370/253; 370/252; 370/337

(58) Field of Classification Search
None
See application file for complete search history.

(56) References Cited

U.S. PATENT DOCUMENTS 7,002,918 B1 * 2/2006 Prieto et al. .................. 370/252
7,995,493 B2 * 8/2011 Anderlind et al. ........... 370/252

* cited by examiner

*Primary Examiner* — Afshawn Towfighi
(74) *Attorney, Agent, or Firm* — McClure, Qualey & Rodack, LLP

(57) ABSTRACT

A network resource allocating method for a residential gateway includes the following steps. A first downlink bandwidth is allocated to a residential gateway for process of a first service. A second downlink bandwidth is allocated to the residential gateway for process of a second service. A processing priority of the first service is higher than a processing priority of the second service. A first downlink rate of the residential gateway is detected when the residential gateway processes the first service. A second downlink rate of the residential gateway is detected when the residential gateway processes the second service. A bandwidth usage state of the residential gateway is determined according to the first and the second downlink rates. The second downlink bandwidth of the residential gateway is adjusted according to the bandwidth usage state such that the quality of service (QoS) of the first service or the second service is enhanced.

13 Claims, 4 Drawing Sheets

NETWORK RESOURCE ALLOCATING METHOD AND COMPUTER PROGRAM PRODUCT THEREOF

This application claims the benefit of People's Republic of China application Serial No. 201110129638.1, filed May 10, 2011, the subject matter of which is incorporated herein by reference.

BACKGROUND OF THE DISCLOSURE

1. Field of the Disclosure

The disclosure relates in general to a network resource allocating method and a computer program product thereof, and more particularly to a network resource allocating method for a residential gateway, and a computer program product thereof.

2. Description of the Related Art

The guarantee of the quality of service (QoS) is very important to a network with the limited capacity. In practice, there are two methods of realizing QoS guarantee. The first method is to provide a lot of network resources, and to adopt rich and safe additional devices to meet the requirement of expected high data flow. The second method is to require users to reserve the bandwidth, and the bandwidth reservation is accepted under the precondition of reliable services. However, no matter which method is adopted, a high costs is to be considered, and the condition that the peak data flow exceeds what is expected cannot be handled. Furthermore, it is also very time-consuming to deploy additional network resources.

The QoS may also be regarded as a control mechanism, which provides correspondingly different priorities for different users or different services, or guarantees the service performance to reach a predetermined level according to different requirements of the application program. Typically, the implementation of the QoS depends on the apparatuses of the customer premise equipment and the central office. In other words, when the network resource competition, such as the bandwidth bottleneck, occurs, the customer premise equipment and the central office need to cooperate with each other to complete the bidirectional QoS.

In addition, as to QoS of the downlink network resource, its bottleneck usually relies on the central office, such as a telecom operator. Therefore, the QoS is usually implemented on the apparatus of the central office. For example, different services may be classified into different priority levels. Then, a predetermined bandwidth is reserved for the high priority service. However, if the reserved bandwidth is too high, the problem of bandwidth wastage occurs when the high priority service is not used. Furthermore, if the reserved bandwidth is too low, the QoS of the high priority service cannot be guaranteed.

The above-mentioned method of realizing QoS is substantially based on fixed QoS rules, and cannot respond to usage states of various services. Furthermore, the typical customer premise equipment lacks the authority to directly control the apparatus of the central office to make corresponding modification. So, the QoS implemented on the apparatus of the central office encounters the inconvenient usage problem in practice.

SUMMARY OF THE DISCLOSURE

The disclosure is directed to a network resource allocating method and a computer program product thereof, wherein the quality of service (QoS) guarantee is realized by monitoring the usage condition of a downlink network resource of a residential gateway.

According to a first aspect of the present disclosure, a network resource allocating method for a residential gateway is provided. The network resource allocating method includes the following steps. A first downlink bandwidth is allocated to the residential gateway for process of a first service. A second downlink bandwidth is allocated to the residential gateway for process of a second service. A processing priority of the first service is higher than a processing priority of the second service. A first downlink rate of the residential gateway is detected when the residential gateway processes the first service. A second downlink rate occurred of the residential gateway is detected when the residential gateway processes the second service. A bandwidth usage state of the residential gateway is determined according to the first downlink rate and the second downlink rate. The second downlink bandwidth of the residential gateway is adjusted according to the bandwidth usage state such that a QoS of the first service or the second service is enhanced.

According to a second aspect of the present disclosure, a computer program product is provided. An electronic device loads the program product to perform the above-mentioned method. In addition, this computer program product may be regarded as covering a computer readable information storage medium, on which at least one program or software module is stored, wherein the storage medium may be regarded as one representation of the computer program product, and the program may be used to perform the above-mentioned method.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The preferred but non-limiting embodiments will be described in the following without restricting the claims of the application. In addition, non-essential elements are omitted from the drawings of the embodiment in order to clearly show the technological features of the disclosure.

In the network resource allocating method and its computer program product according to the embodiment of the disclosure, the downlink network resources, such as bandwidths, used by various services are adjusted by monitoring the usage condition of the network resource of the residential gateway. Thus, the bottleneck of the downlink network resource may be transferred to the apparatus of the customer premise equipment, such as the residential gateway, so that the apparatus of the customer premise equipment has the ability of ensuring the quality of service (QoS) and the convenience in use may be enhanced. In one embodiment, the residential gateway may allocate network resources to different services in an asymmetric manner so that the QoS guarantee of the services with different priority levels can be realized.

Figure 1:
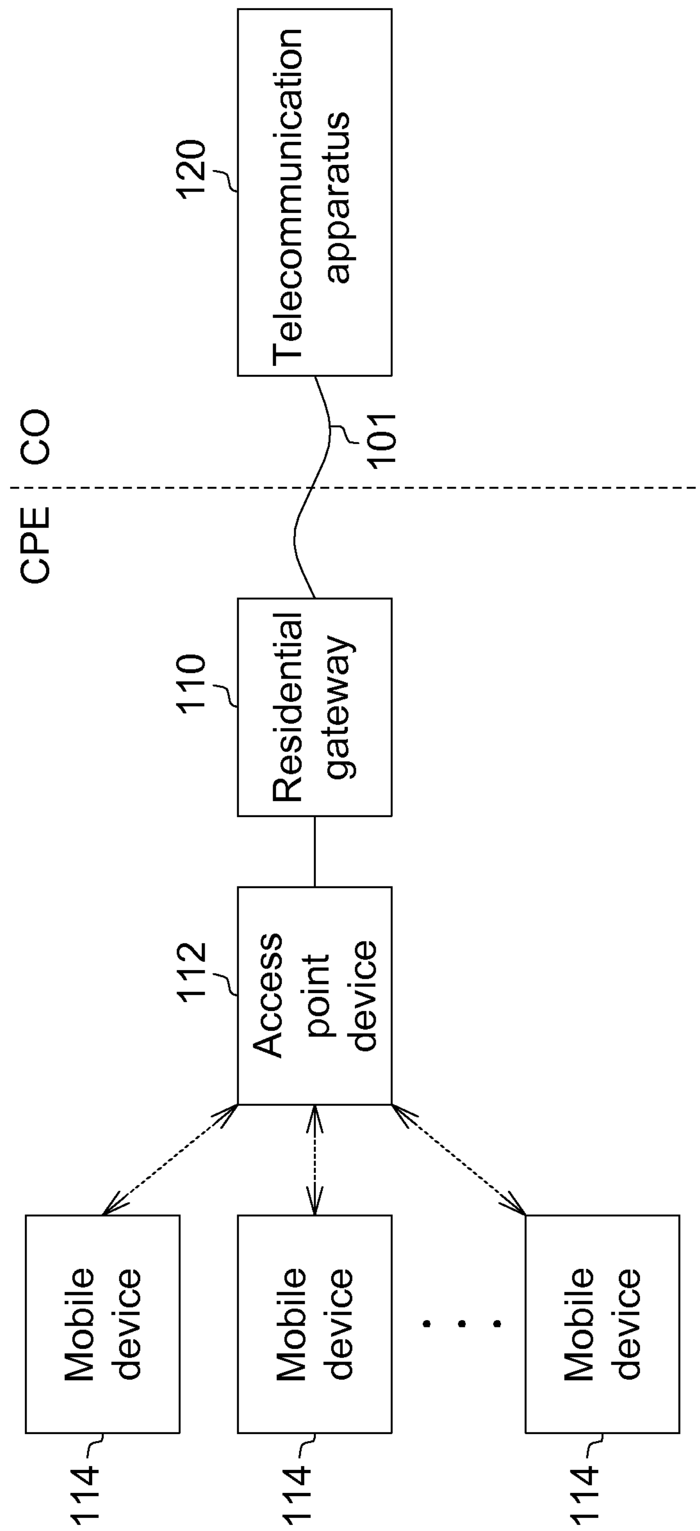
FIG. 1 is a schematic illustration showing an example of the architecture of a network system.

FIG. 1 is a schematic illustration showing an example of the structure of a network system 10. Referring to FIG. 1, the network system 10 has a customer premise equipment CPE and a central office CO. The customer premise equipment CPE is, for example, a customer representing a personal or an enterprise subscriber. The central office CO represents, for example, a telecom operator or a telecommunication company. The customer premise equipment CPE communicates with the central office CO through a cable 101. In this example, a residential gateway 110 located at the customer premise equipment CPE is connected to the cable 101. In other practical example, the residential gateway 110 located at the customer premise equipment CPE may be connected to the cable 101 through any other signal transferring apparatus. The residential gateway 110 communicates with a telecommunication apparatus 120 through the cable 101. For example, an audio or data signal is transferred between the residential gateway 110 and the telecommunication apparatus 120. In practice, the audio and data signals may be transferred concurrently. The telecommunication apparatus 120 includes a switch, a network or any other apparatus provided by the telecom operator.

The residential gateway 110, which may be referred to as a home gateway, can provide various functions, such as the gateway function of the internal home network and the external home network (e.g., the customer premise equipment CPE network and the central office CO network), the firewall function, or the routing function of being connected to two or more than two computer apparatuses at customer premise equipment CPE. In one practical example, the residential gateway 110 is a router, a modem or any other gateway device, for example. However, the disclosure is not limited thereto.

In the example of FIG. 1, as viewed from the customer premise equipment CPE, the residential gateway 110 may be connected to an access point device 112. The access point device 112 may be for example connected to a mobile device 114 through the communication link in accordance with a specific communication protocol, so as to provide various services including, for example, an audio service, a data service or a video service. The access point device 112 is, for example, a wireless network access point device, such as a femtocell or any other access point device capable of providing various services. The mobile device 114 may include, for example, a mobile phone, a personal digital assistant (PDA) or a computer.

Figure 2:
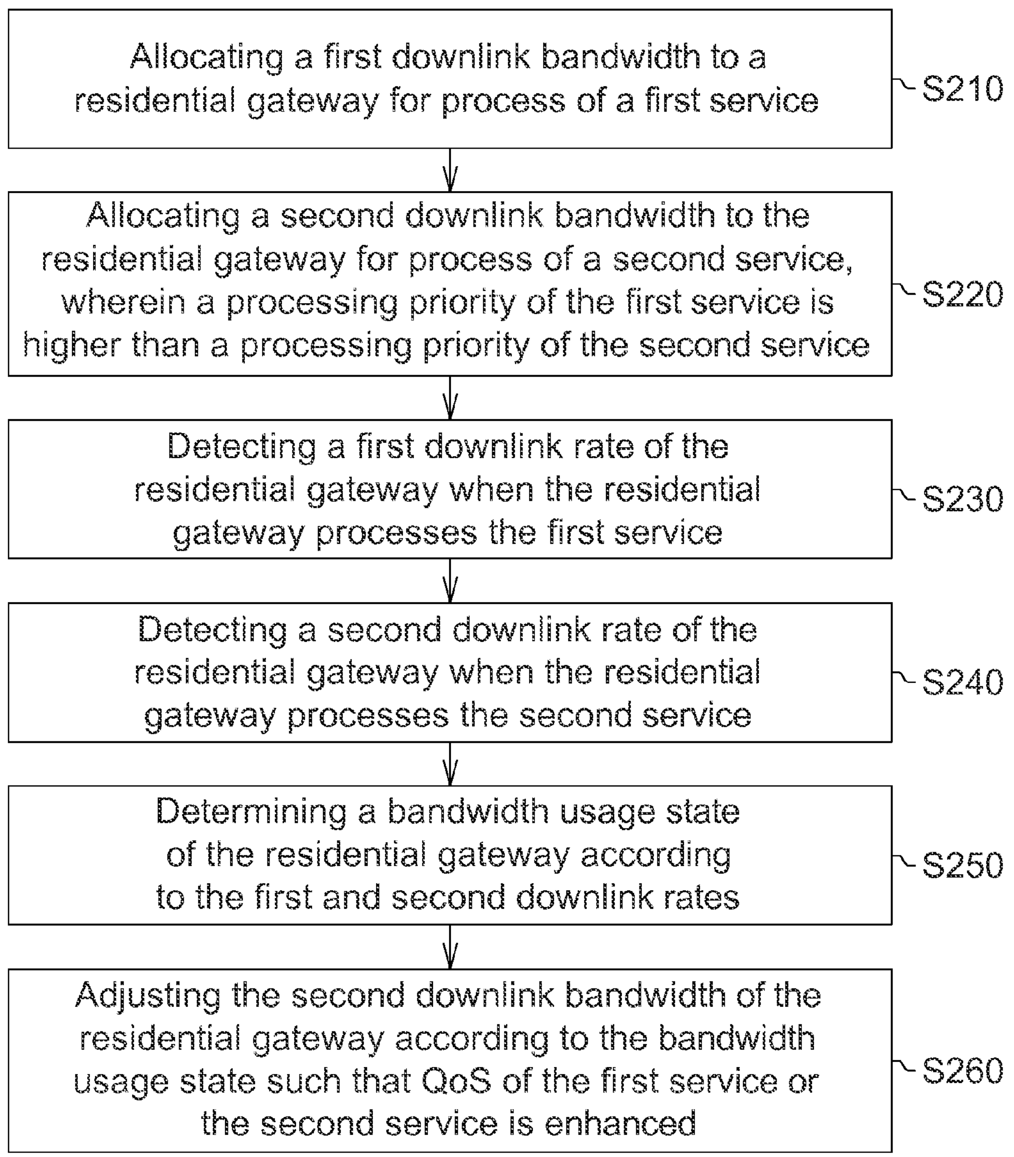
FIG. 2 is a flow chart showing a network resource allocating method according to an embodiment of the disclosure.

FIG. 2 is a flow chart showing a network resource allocating method according to an embodiment of the disclosure. As shown in FIG. 2, the network resource allocating method is for the residential gateway 110 of FIG. 1. For example, the method controls the residential gateway 110 to allocate bandwidths to different services. The network resource allocating method is implemented in the residential gateway 110 or the access point device 112 of the customer premise equipment CPE by way of software, or implemented in any other apparatus located at the customer premise equipment CPE in conjunction with firmware or hardware.

The network resource allocating method of FIG. 2 includes a number of steps. In step S210, a first downlink bandwidth is allocated to the residential gateway 110 for process of a first service. In step S220, a second downlink bandwidth is allocated to the residential gateway 110 for process of a second service. The processing priority of the first service is higher than the processing priority of the second service. In step S230, a first downlink rate of the residential gateway is detected when the residential gateway 110 processes the first service. In step S240, a second downlink rate of the residential gateway is detected when the residential gateway 110 processes the second service. In step S250, a bandwidth usage state of the residential gateway 110 is determined according to the first downlink rate and the second downlink rate. In step S260, the second downlink bandwidth of the residential gateway 110 is adjusted according to the bandwidth usage state such that the QoS of the first service or the second service is enhanced. Thus, the bottleneck of the downlink network resource may be transferred to the apparatus of the customer premise equipment, such as the residential gateway, so that the apparatus of the customer premise equipment has the ability of realizing QoS guarantee and enhancing the convenience in use.

Figure 3:
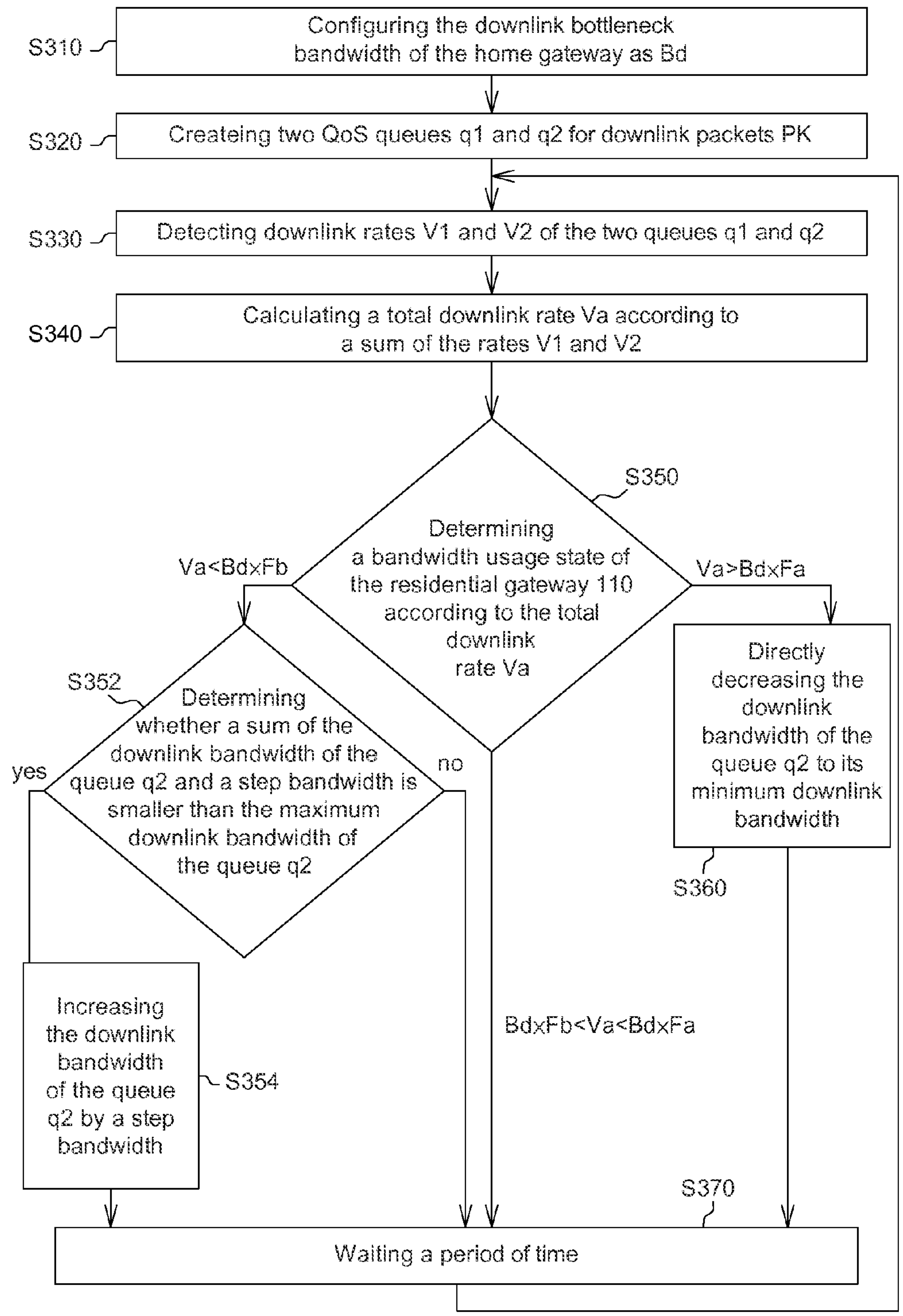
FIG. 3 is a detailed flow chart showing the network resource allocating method of FIG. 2.
Figure 4:
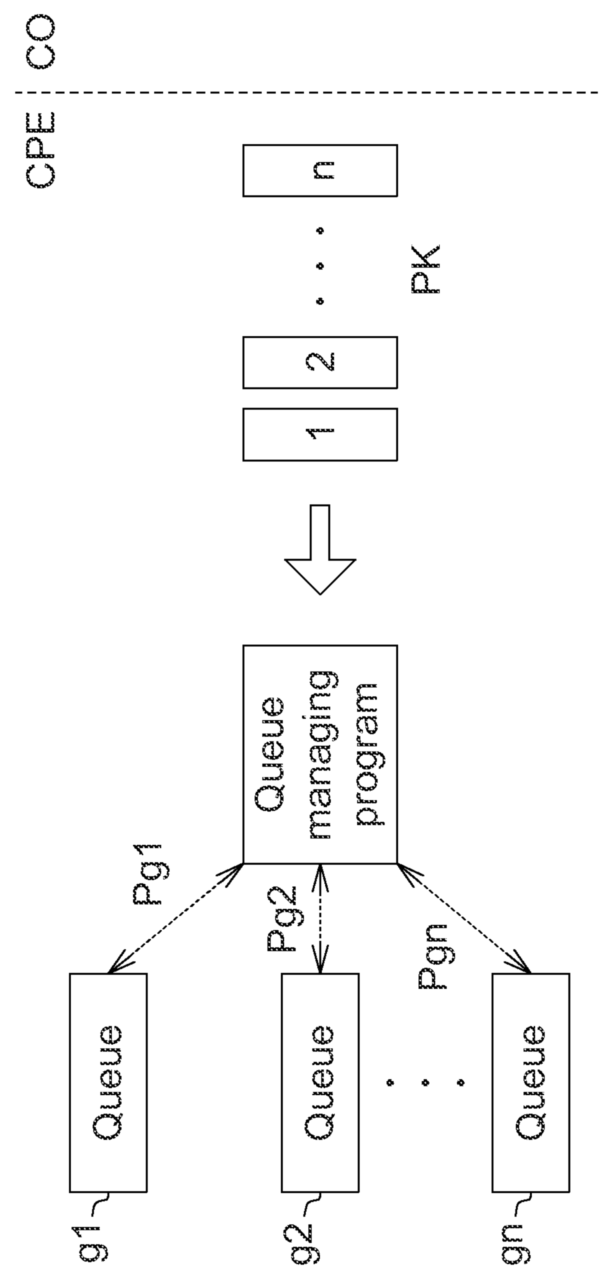
FIG. 4 is a schematic illustration showing the network resource allocating method of FIG. 3 in allocating the network resource.

FIG. 3 is a detailed flow chart showing the network resource allocating method of FIG. 2. FIG. 4 is a schematic illustration showing the network resource allocating method of FIG. 3 in allocating the network resource. Referring to both FIGS. 3 and 4, the network resource allocating method includes a number of parts, which will be described in the following.

1. Transferring of the Bottleneck of Downlink Bandwidth

Usually, the bottleneck of the downlink packet PK is located at the central office PO. In order to control the downlink packet PK properly, this method transfers the bottleneck from the central office PO to the customer premise equipment CPE, such as the residential gateway 110 of the customer premise equipment CPE.

In step S310, the downlink bottleneck bandwidth of the residential gateway 110 is configured as a value of Bd which is approximately smaller than the actually available downlink bandwidth. For example, if the residential gateway 110 actually available downlink bandwidth is 2 Mbps, then the downlink bottleneck bandwidth Bd may be configured as, for example, 1.9 Mbps, or any other value approximately smaller than 2 Mbps.

2. Monitoring of the Downlink Rate

In step S320, two QoS queues q1 and q2 are created for the downlink packet PK. The queue q1 is in charge of processing packets of a first service, such as the packets of the audio service or the video service. Thus, the downlink audio packets will flow into the queue q1. The queue q2 is in charge of processing packets of a second service, such as the packets of the data service. Thus, the downlink data packets will flow into the queue q2. The priority Pq1 of the queue q1 is higher than the priority Pq2 of the queue q2. However, the disclosure is also not limited thereto. In other practical examples, another queue, such as qn, may also be created.

In step S330, downlink rates V1 and V2 of the two queues q1 and q2, such as the packet downlink rates during the processing of the services, are detected.

In step S340, a total downlink rate Va is calculated according to a sum of the two rates V1 and V2. For example, Va=V1+V2. Thus, a total downlink rate Va of the residential gateway 110 can be detected.

3. Correction of the Downlink Bandwidth

Whether to perform the bandwidth correction of the queue q1 or q2 is determined according to the result of monitoring the downlink rate.

As shown in step S350, the bandwidth usage state of the residential gateway 110 is determined according to the total downlink rate Va. The bandwidth usage state may be used to correct the allocated downlink bandwidths of the queue q1 or q2 for service processing, so as to enhance the QoS of the services.

For example, in a bandwidth idle state, the allocated bandwidth of the queue q2 is increased by a step increment every other period of time, and the sum of the increased bandwidths does not exceed the predetermined maximum. This method may also be regarded as that the low-priority queue q2 borrows an idle bandwidth from the high-priority queue q1. The bandwidth borrowed therefrom each time is not too high, whereas the bandwidth of the queue q2 is gradually adjusted many times. Thus, from the increased bandwidth of queue q2, the QoS of the service of the queue q2 can be enhanced. In addition, it is also possible to prevent the QoS of the service of the high-priority queue q1 from being influenced due to the significant adjustment of the bandwidth of the low-priority queue q2.

Furthermore, if a bandwidth competition state is detected, the bandwidth of the low-priority queue q2 may be decreased to the predetermined minimum to guarantee that the high-priority queue q1 can use the maximum bandwidth to process its service. The bandwidth of the low-priority queue q2 is decreased directly, or in one step, to its minimum. Thus, the influence on the high-priority queue q1 can be decreased, and the QoS of the service of the high-priority queue q1 can be guaranteed.

One example of correcting the downlink bandwidth will be described in the following. In this example, the correction of the downlink bandwidth is described in terms of many parameters, wherein:

Bd1 represents a downlink bandwidth used by the queue q1;

Bd2 represents a downlink bandwidth used by the queue q2;

BdV1max represents a maximum downlink bandwidth required by the queue q1;

BdV2min represents a minimum downlink bandwidth of the queue q2;

BRmax represents a maximum bandwidth which is borrowable or lendable;

BdV2max represents the maximum downlink bandwidth of the queue q2;

BRstep represents a step bandwidth which is borrowable or lendable;

Fa represents a competition factor, where $0<Fa<1$; and

Fb represents a compensation factor, where $0<Fb<Fa<1$.

The value BdV1max of the maximum downlink bandwidth of the queue q1 ranges between 0 and the downlink bottleneck bandwidth Bd, for example. In this case, $0<BdV1max<Bd$.

The value BdV2min of the minimum downlink bandwidth of the queue q2 may be calculated according to the difference between the downlink bottleneck bandwidth Bd and the value BdV1max of the maximum downlink bandwidth of the queue q1. In this case, $BdV2min=Bd-BdV1max$.

The competition factor Fa and the compensation factor Fb are used to define a zone that is may serve as a buffer for bandwidth modification.

The difference between the minimum downlink bandwidth BdV2min and the maximum bandwidth BdV2max of the queue q2 may be regarded as the maximum bandwidth BRmax that the queue q2 may be borrowed from other queue or queues. In this case, $BRmax=BdV2max-BdV2min$.

In the step S350, when the total downlink rate Va is smaller than a first predetermined rate, such as a product of the downlink bottleneck bandwidth Bd and the compensation factor Fb ($Va<Bd\times Fb$), it represents that the bandwidth usage state is a bandwidth idle state. In the bandwidth idle state, this method increases the downlink bandwidth Bd2 of the queue q2 so as to enhance the QoS of the second service that the queue q2 is in charge of. In one embodiment, this method gradually increases the downlink bandwidth Bd2 of the queue q2.

For example, in step S352, it is determined whether a sum of the downlink bandwidth Bd2 of the queue q2 and one step bandwidth BRstep is smaller than the maximum downlink bandwidth BdV2max of the queue q2. For example, whether $Bd2+BRstep<BdV2max$ is determined. Alternatively, whether $BRstep<BRmax-BR$ is determined, wherein $BR=Bd2-BdV2min$. If yes, step S354 is entered to increase the downlink bandwidth Bd2 of the queue q2 by one step bandwidth BRstep (e.g., $Bd2=Bd2+BRstep$); and if not, step S370 is entered to wait a period of time.

As can be understood from the above-mentioned description, the idle bandwidth is higher in the bandwidth idle state, so the downlink bandwidth Bd2 used by the queue q2 with the lower priority is increased. For example, the downlink bandwidth Bd2 used by the queue q2 is gradually increased in a manner of increasing one step bandwidth BRstep at each time until the maximum downlink bandwidth BdV2max of the queue q2 is reached. Alternatively, it is also possible to increase the downlink bandwidth Bd2 gradually and slightly in another manner. Thus, the queue q2 can use a higher downlink bandwidth to process its service, and the QoS of the second service that which the queue q2 is in charge of can be thus enhanced.

In contract, in the step S350, when the total downlink rate Va is greater than a second predetermined rate, such as the product of the downlink bottleneck bandwidth Bd and the competition factor Fa ($Va>Bd\times Fa$), it represents that the bandwidth usage state is a bandwidth competition state. In the bandwidth competition state, this method decreases the downlink bandwidth Bd2 of the queue q2 so as to enhance the QoS of the first service that the queue q1 is in charge of. In one embodiment, the downlink bandwidth Bd2 of the queue q2 is directly decreased to a minimum bandwidth.

For example, in step S360, the downlink bandwidth Bd2 used by the queue q2 is directly decreased to its minimum downlink bandwidth BdV2min. After the step S360, the method enters the step S370.

As can be understood from the above-mentioned description, the idle bandwidth is lower in the bandwidth competition state, so the downlink bandwidth Bd2 used by the low-priority queue q2 is decreased to, for example, the minimum downlink bandwidth BdV2min of the queue q2 directly. Alternatively, it is also possible to significantly decrease the downlink bandwidth Bd2 of the queue q2 in anther manner without affecting the QoS of the first service that the queue q1 is in charge of. Thus, the QoS of the first service that the queue q1 is in charge can be enhanced.

In the step S350, when the total downlink rate Va falls within the zone defined by the competition factor Fa and the compensation factor Fb, for example, when the rate Va ranges between the two predetermined rates ($Bd\times Fb<Va<Bd\times Fa$), the bandwidth correction is not performed. Then, the method enters the step S370.

In this example, the downlink bandwidth of the queue q2 is gradually and slightly increased in the bandwidth idle state, while the downlink bandwidth of the queue q2 is directly and significantly decreased in the bandwidth competition state. This method performs the correction on the downlink bandwidth in an asymmetric manner of slightly increasing but significantly decreasing the bandwidth according to the result of monitoring the downlink rate. Thus, the QoS of the service of each of the queues q1 and q2 can be guaranteed.

Furthermore, in order to avoid the non-essential bandwidth correction, the above-mentioned parameters may further be configured such that the maximum downlink bandwidth BdV2max of the queue q2 is smaller than the second predetermined rate, for example, BdV2max<Bd×Fa or BdV2min+BRmax<Bd×Fa. Thus, it is possible to prevent the queue q2 from borrowing the too high bandwidth, and prevent erroneously identifying that the bandwidth competition state occurs.

In addition, this disclosure additionally discloses an embodiment of a computer program product. The computer program product is composed of multiple program code fragments, for example. The computer program product may be implemented as an application program or exists in a system program. After an electronic device with a buffer memory loads this program product, this electronic device executes multiple program commands, which execute the embodiment of the above-mentioned method. In addition, this computer program product may be regarded as covering a computer readable information storage medium, on which at least one program or software module is stored, wherein the computer readable information storage medium may be regarded as one representation of the computer program product. This program can be used to execute the embodiment of the method. The computer readable information storage medium of this embodiment includes, for example but without limitation to, an optical information storage medium, or a magnetic information storage medium or firmware, which may also include program codes that can be transferred over a network or a transfer medium, such as the air.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network resource allocating method for a residential gateway, the residential gateway being connected to a telecommunication apparatus of a telecommunication operator through a cable, the method comprising the steps of:

allocating a first downlink bandwidth to the residential gateway for process of a first service;

allocating a second downlink bandwidth to the residential gateway for process of a second service, wherein a processing priority of the first service is higher than a processing priority of the second service;

detecting, when the residential gateway processes the first service, a first downlink rate of the residential gateway;

detecting, when the residential gateway processes the second service, a second downlink rate of the residential gateway;

determining a bandwidth usage state of the residential gateway according to the first downlink rate and the second downlink rate;

decreasing, when the bandwidth usage state of the residential gateway is a bandwidth competition state, the second downlink bandwidth directly to a minimum bandwidth; and increasing, when the bandwidth usage state of the residential gateway is a bandwidth idle state, the second downlink bandwidth gradually to a maximum bandwidth.

2. The method according to claim 1, wherein the step of determining the bandwidth usage state of the residential gateway according to the second downlink rate and the first downlink rate comprises:

determining a total downlink rate of the residential gateway according to the first downlink rate and the second downlink rate; and determining the bandwidth usage state as the bandwidth idle state when the total downlink rate is smaller than a first predetermined rate.

3. The method according to claim 2, wherein the first predetermined rate relates to a product of a downlink bottleneck bandwidth and a first factor.

4. The method according to claim 2, wherein the step of determining the bandwidth usage state of the residential gateway according to the first downlink rate and the second downlink rate further comprises:

determining the bandwidth usage state as the bandwidth competition state when the total downlink rate is greater than a second predetermined rate.

5. The method according to claim 4, wherein the second predetermined rate relates to a product of a downlink bottleneck bandwidth and a second factor.

6. The method according to claim 1, wherein the first service and the second service are provided for a femtocell.

7. The method according to claim 1, wherein the first service is an audio service or a video service.

8. The method according to claim 1, wherein the second service is a data service.

9. A non-transitory computer readable information storage medium storing a computer program executed by a computation device, to cause the computation device to perform the network resource allocating method according to claim 1.

10. A network resource allocating method for a residential gateway, the residential gateway being connected to a telecommunication apparatus of a telecommunication operator through a cable, the method comprising the steps of:

allocating a first downlink bandwidth to the residential gateway for process of a first service;

allocating a second downlink bandwidth to the residential gateway for process of a second service, wherein a processing priority of the first service is higher than a processing priority of the second service;

detecting a first downlink rate of the residential gateway;

detecting a second downlink rate of the residential gateway;

determining a total downlink rate of the residential gateway according to the first downlink rate and the second downlink rate;

decreasing, when the total downlink rate is greater than a second predetermined rate, the second downlink bandwidth directly to a minimum bandwidth; and increasing, when the total downlink rate is smaller than a first predetermined rate, the second downlink bandwidth gradually to a maximum bandwidth;

wherein the first predetermined rate relates to a product of a downlink bottleneck bandwidth and a first factor, and the second predetermined rate relates to a product of the downlink bottleneck bandwidth and a second factor.

11. The method according to claim 10, further comprising:

waiting for a period of time, when the total downlink rate ranges between the first predetermined rate and the second predetermined rate without adjusting the second downlink bandwidth.

12. The method according to claim 10, wherein the second predetermined rate is greater than the maximum bandwidth or the minimum bandwidth plus a maximum borrowable bandwidth.

13. The method according to claim 10, wherein the first factor is smaller than the second factor.

* * * * *